United States Patent [19]

Meinhof

[11] Patent Number: 4,633,267

[45] Date of Patent: Dec. 30, 1986

[54] ARRANGEMENT FOR THE EJECTION OF INDIVIDUAL DROPLETS FROM DISCHARGE OPENINGS OF AN INK PRINTER HEAD

[75] Inventor: André H. Meinhof, Berlin, Fed. Rep. of Germany

[73] Assignee: Siemens Aktiengesellschaft, Munich and Berlin, Fed. Rep. of Germany

[21] Appl. No.: 804,095

[22] Filed: Dec. 3, 1985

[30] Foreign Application Priority Data

Dec. 14, 1984 [DE] Fed. Rep. of Germany ....... 3445720

[51] Int. Cl.[4] .............................................. G01D 15/18

[52] U.S. Cl. ................................ 346/1.1; 346/140 R; 310/15

[58] Field of Search .......................... 346/140, 75, 1.1; 310/13, 15, 27

[56] References Cited

U.S. PATENT DOCUMENTS 3,924,974 12/1975 Fischbeck ......................... 346/75 X
4,023,180 5/1977 Zenner ............................ 346/140 X
4,336,544 6/1982 Donald ........................... 346/140 X
4,544,933 10/1985 Heinzl ................................ 346/140

OTHER PUBLICATIONS

Hochberg et al.; Multinozzle Line Printer Using Electromagnetic Valving, IBM TDB, vol. 16, No. 2, Jul. 1973, pp. 467–468.

Lennemann et al.; Mercury Controlled Ink Jet, IBM TDB, vol. 18, No. 7, Dec. 1975, pp. 2195–2196.

*Primary Examiner*—Joseph W. Hartary
*Attorney, Agent, or Firm*—Hill Van Santen, Steadman & Simpson

[57] ABSTRACT

In an arrangement for the ejection of individual droplets in an ink printer head, the drive elements fashioned as conductor loops are formed by U-shaped middle parts in the region of the ink channel the conductor loops lie in the field of a magnet. system; a respective discharge opening is allocated to each conductor loop; the conductor loops are respectively formed by webs or legs of conductive material whose low ends are secured at one side of the ink chamber at the wall bounding the ink chamber.

10 Claims, 6 Drawing Figures

ARRANGEMENT FOR THE EJECTION OF INDIVIDUAL DROPLETS FROM DISCHARGE OPENINGS OF AN INK PRINTER HEAD

BACKGROUND OF THE INVENTION

1. Field of the Invention

The invention relates to an arrangement for the ejection of individual droplets from discharge openings of an ink printer head having conductor loop drive elements and a magnet system.

2. Description of the Prior Art

An arrangement has been proposed for ink printer devices wherein ink is ejected in the form of individual droplets wherein the drive elements are secured at both sides of an ink channel in the form of conductor loops and their movable middle parts angled arrow-like proceed in the ink channel (U.S. Pat. No. 4,544,933). A magnet system extending over the entire length of the ink channel generates a magnetic field in the region of the drive elements. A force acting on the middle part is generated by a change of the current flux in a drive element, for example by switching the current on, this force moving the middle part in the direction toward a discharge opening allocated to this middle part and leading to the ejection of an individual droplet.

A write head can be constructed with such an arrangement wherein the advantages of an operationally reliable functioning can be combined with a low-outlay manufacture. It turns out, however, that the demands recently made of dot-matrix printers cannot be fulfilled to the desired degree with this arrangement. Thus, the high resolution required for a good print quality is limited, since the division of the drive elements and, thus, the division of the discharge openings is limited by the arrangement of the drive elements. An overlap of the printing points on the recording medium can only be achieved by enlarging the diameter of the discharge openings. The drive elements fastened at both sides of the ink channel not only limit the possibility of arranging the discharge openings in multiple rows but, rather, the frequently desired legibility of the characters immediately after a printing operation is also limited.

SUMMARY OF THE INVENTION

An object of the invention is to provide an arrangement with which the number of printing points forming the characters can be increased and an overlap of the printing points is achieved without enlarging the diameters of the discharge openings. At the same time, the outlay for the magnet system required for the droplet ejection should also be reduced. Further, a write head should be created which meets the desire for smaller dimensions and wherein the legibility of the characters immediately after their representation on the recording medium is improved.

This object is achieved by having both ends of the conductor loop secured in an insulated manner at one side of the ink chamber such that the webs of the conductor loops extend arrow-like into the ink chamber and form a U-shaped, movable part in the region of the ink channel and the magnet system being a two-poled magnet system whose field lines penetrate the webs in the immediate proximity of the U-shaped, movable middle parts.

The essential advantages connected with the invention are comprised therein that the drive elements and, thus, the discharge openings as well can either be arranged single-rowed in the immediate proximity of the edge of the write head or can be arranged double-rowed. In the former case, a noticeable improvement in the legibility of printed characters during or immediately after the printing operation derives; in the latter case, the possiblity derives of arranging the drive elements and, thus, the discharge openings of the one row offset relative to those of the other row and, thus achieving a noticeable improvement of the print quality.

BRIEF DESCRIPTION OF THE DRAWINGS

The invention shall be set forth in greater detail below with reference to the drawings. Shown therein are.

DESCRIPTION OF THE PREFERRED EMBODIMENTS

Figure 1:
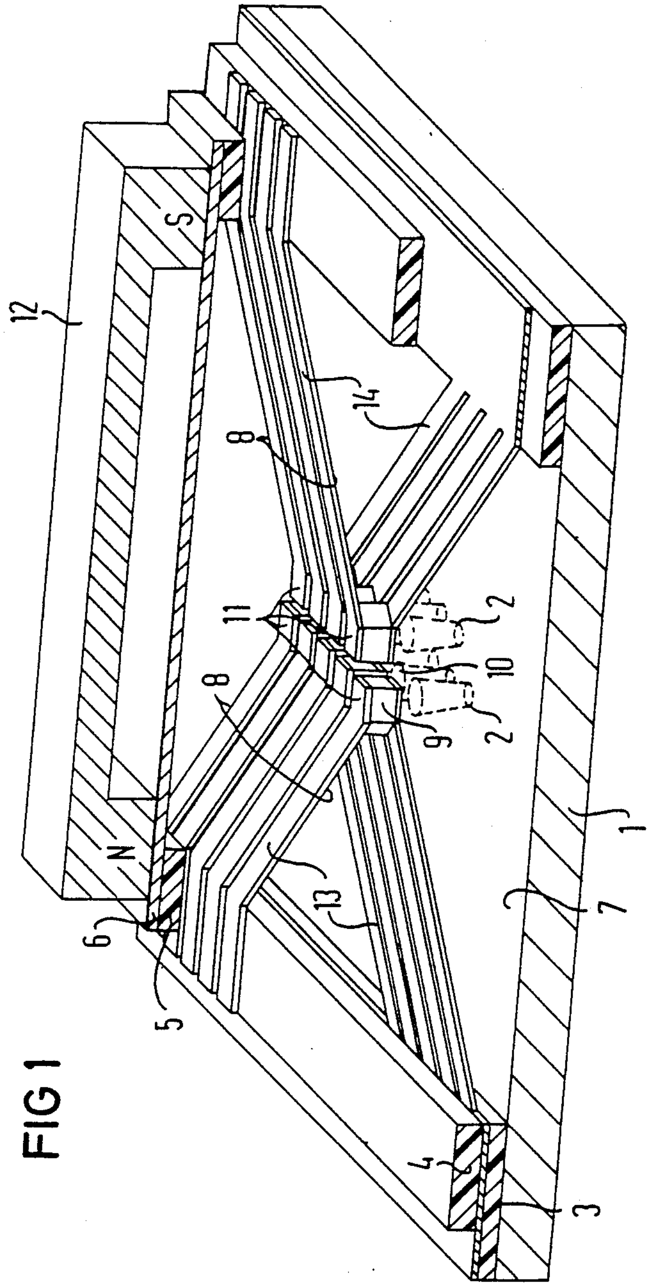
FIG. 1 is a first exemplary embodiment of the structure of a double-rowed arrangement of the discharge openings.

FIG. 1 shows an exemplary embodiment of the structure of a write head comprising two rows of discharge openings. The essential components of the arrangement are a base member 1 in which discharge openings 2 are fashioned in a known way. Insulating layers 3, 4 and 5 are applied to the base member 1, these insulating layers forming the walls of an ink chamber 7 which is bounded by a cover 6 and the base member 1. The ink chamber 7 communicates with an ink reservoir via an ink supply system not shown here. The application of the insulating layers 3, 4 and 5 onto the base member 1, the sealing of the ink chamber 7 toward the outside as well as the application of the cover 6 are not the subject matter of the invention and can be executed in known fashion.

The drive elements for the ejection of individual ink droplets are provided by conductor loops 8. In the exemplary embodiment of FIG. 1, these are fashioned of narrow strips or webs 13, 14 of conductive material. The two webs forming a conductor loop 8 are secured at only one side of the ink chamber 7. The webs are secured such and shaped such that they extend arrow-like, or relatively obliquely, into the ink chamber 7, come together in the region of the discharge openings 2, namely above the discharge openings 2 there, and are connected by a conductive connector part 9. The region of the ink chamber 7 in which the webs connected by means of the connector parts 9 lie is referred to as an ink channel 10. The fastening of the free ends of the webs 13, 14, i.e. the fastening of the low ends of the conductor loops 8 can, as shown in FIG. 1, ensue such that one web of a conductor loop 8 is secured to the first insulating layer 3 and the other web is secured to the second insulating layer 4 which is situated above the insulating layer 3. The insulating layers 3 and 4 as well as a further insulating layer 5 seal the ink chamber toward the outside. This can occur, for example, by means of intermediate plies of sealing films or the conductive webs can be introduced into the insulating layers. By means of a corresponding dimensioning of the insulating layers 3 and 4, a simple, individual contacting of the conductor loops 8 which can be executed from the outside is possible.

Toward the top, the ink chamber 7 is terminated by the cover 6 which can be fashioned as a cover plate. The magnet system 12 is arranged on the cover plate 6. In the exemplary embodiments, this is composed of a two-poled magnet element which is shown here as a permanent magnet. Employing an electro-magnet instead of a permanent magnet also lies within the framework of the invention. The poles N and S of the magnet element 12 lie in the region of the lateral fastenings of the webs 13, 14 of the conductor loops 8. The course of the field lines is thereby such that the field lines penetrate the webs 13 or, respectively, penetrates in close proximity to the ink channel 10, so that the movable middle part 11 of the appertaining conductor loop 8 is moved in the direction toward the discharge opening 2 allocated to it when a conductor loop 8 generates a change of current flux, for example as a result of the current being switched on. The pressure wave thereby generated leads the ejection of an ink droplet from the discharge opening 2. The movable middle part 11 is subsequently moved back into its position, whereby the quantity of ink output due to the droplet ejection is replenished by suction. The return movement can be effected by reversing the direction of current flux and/or on the basis of the spring properties of the conductor loop itself.

The single-sided fastening of the webs 13, 14 of the conductor loops 8 which has been set forth enables the middle parts 11 of the webs 13 of the conductor loops 8 which are securel at one side of the ink chamber to form a row of drivė elements to which a corresponding row of discharge openings 2 is allocated. A second row of drive elements is formed by the webs 14 of conductor loops 8 secured to the other side of the ink chamber 7. The drive elements and, thus, the discharge openings of the two rows as well are preferably offset relative to one another, so that the desired improvement in the division of the discharge openings results.

Figure 2:
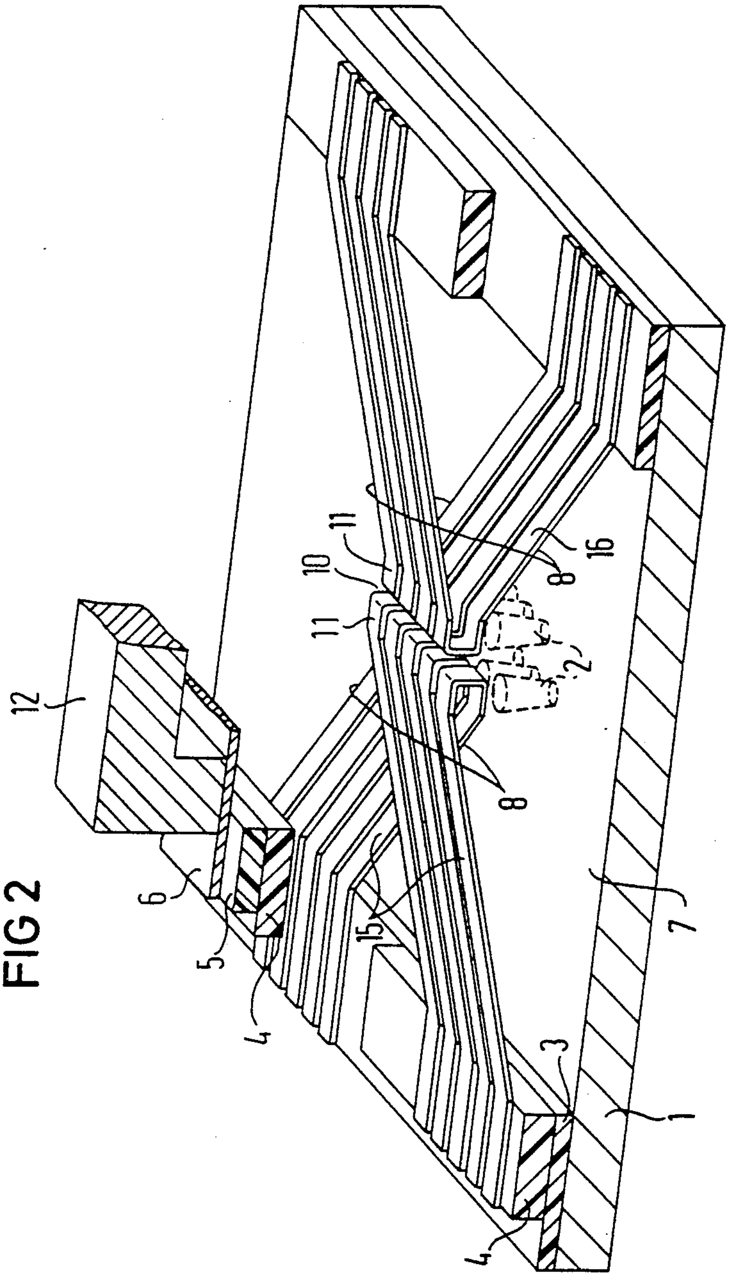
FIG. 2 is a second exemplary embodiment of an arrangement having discharge openings arranged in two rows.

FIG. 2 shows another exemplary embodiment which differs from the exemplary embodiment of FIG. 1 only in the formation of the conductor loops. Here, the conductor loops 8 have webs which are formed by band-shaped strips or legs 15, 16 of conductive material which are bent into a U-shape in the region of the ink channel 10. The legs 15 of the first row of conductor loops 8 are secured to the one side and the legs 16 of a second row of conductor loops 8 are secured to the other side of the ink chamber 7. In the region of the ink channel 10, the conductor loops form a movable, U-shaped middle part 11. The free ends of the legs 15 and 16 of the conductor loops 8 extend arrow-like into the ink chamber 7 and form two rows of movable middle parts in the region of the ink channel 10.

As explained with reference to FIG. 1, the ink chamber 7 herein is likewise bounded by the base member 1, by the insulating layers 3, 4 and 5 as well as by a cover plate 6, being bounded in an ink-tight fashion. The magnet system situated on the cover plate 6 is composed of a two-poled magnet element 12. The field lines penetrate the webs or legs 15 and 16 in the region of the ink channel 10. The manner of functioning for ejecting individual droplets corresponds to the manner of functioning described with reference to FIG. 1

Figure 3:
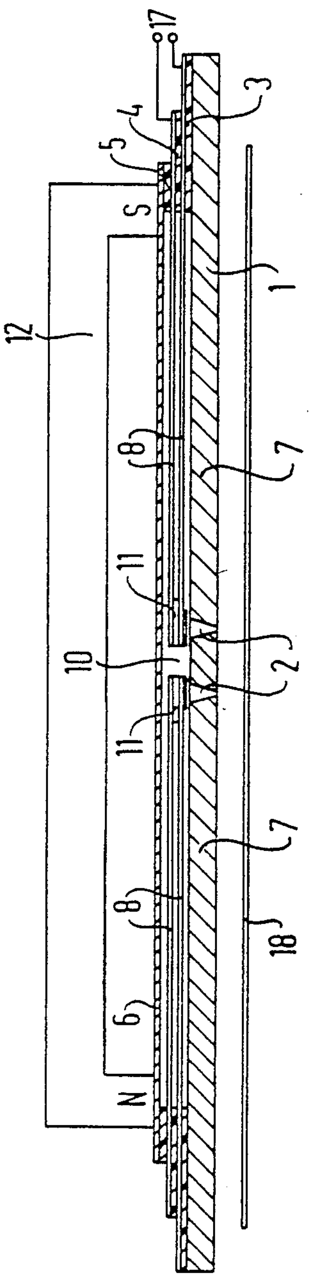
FIG. 3 is a sectional view of the exemplary embodiments of FIGS. 1 and 2.

FIG. 3 shows a section view through a write head according to the exemplary embodiments of FIG. 1 or FIG. 2. The insulating layers 3, 4 and 5 are applied to the base member 1 which contains two rows of discharge openings 2, these insulating layers bounding the ink chamber 7 in an ink-tight fashion. The conductor loops 8 proceed within the ink chamber 7, whereby the legs or the webs of one row of conductor loops are secured to one and the same side of the ink chamber 7. The conductor loops 8 form the movable middle parts 11 in the region of the ink channel 10, namely immediately above the discharge openings 2 allocated to them. The ink chamber 7 is upwardly terminated by the cover plate 6 over which the magnet system 12 is situated. The excursion of a movable middle part 11 in the direction toward the discharge opening 2 allocated to it effects the ejection of an ink droplet from this discharge opening which is sprayed against a recording medium 18. The excursion of the middle part 11 is caused by a change in the current flux through the conductor loops 8, for example due to selection of the conductor loops 8 via the terminal contactings 17. As known for dot-matrix printers, matrix-like characters or patterns are constructed on the recording medium by means of a relative movement between the write head and the recording medium.

Figure 4:
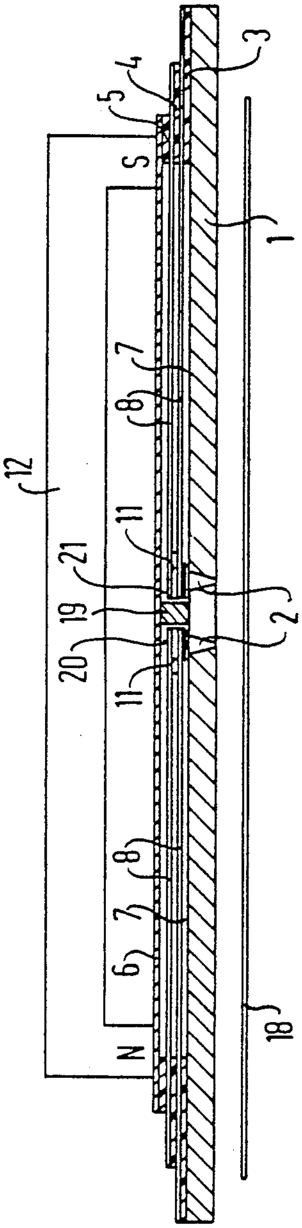
FIG. 4 is an exemplary embodiment in a sectional view for reducing the cross-talk effects given a double-rowed arrangement.

In accord with a development of the invention, a partition extends in the ink channel over a part of its length, at least over that part of the ink channel in which the movable middle parts lie, this partition subdividing the ink channel into two sub-channels. FIG. 4 shows an exemplary embodiment of this development. The structure of the arrangement of FIG. 4 thereby essentially corresponds the structure already set forth. Differing therefrom, however, a parting wall or partition 19 is provided here, this subdividing the ink channel into a first subchannel 20 and into a second subchannel 21. The sub-channels 20 and 21 are respectively allocated to a row of conductor loops, i.e. to their movable middle parts 11, and are thus also allocated to a row of discharge openings 2. It is thus achieved that the influencing of neighboring discharge openings is reduced when an ink droplet is ejected from a discharge opening. This is based on the fact that the partition 19 damps a disturbing propagation of pressure waves as occurs given the selection and movement of a drive element.

When the parting wall or partition 19 extends over the entire length of the ink channel, then two ink channels which are independent of one another can be created, and these can communicate with different ink reservoirs, for example via their own ink supply system. When ink reservoirs which are filled with different colored ink are employed, then there is the advantageous possibility of two-color printing.

Figure 5:
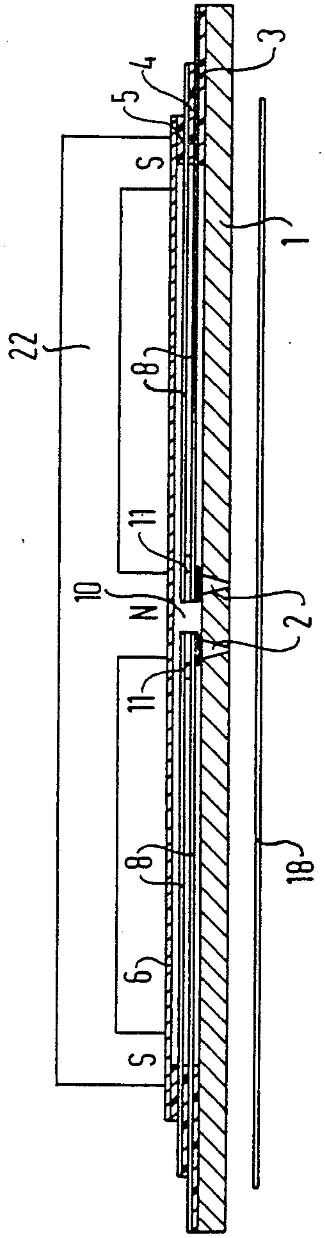
FIG. 5 is an advantageous exemplary embodiment for the realization of the magnet system.

A further development of the invention relates to the formation of the magnet system. FIG. 5 shows an embodiment wherein a permanent magnet 22 is employed, both south poles S thereof lying in the region of the fastening of the ends of the conductor loops 8 and the common north pole N thereof lying in the region of the ink channel 10. The inventively proposed arrangements for the magnet systems are distinguished by a simple shaping of the magnet systems.

Figure 6:
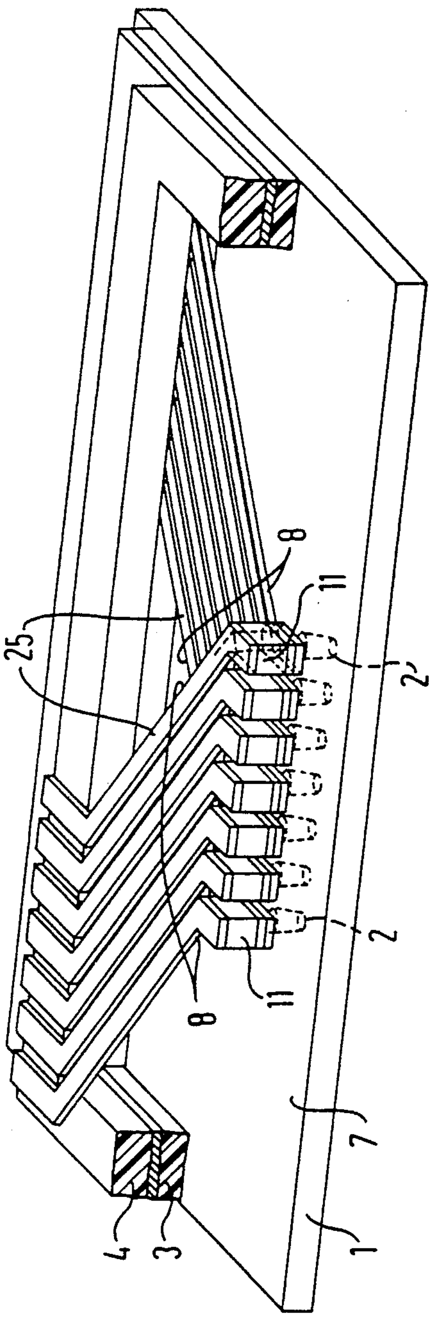
FIG. 6 is an exemplary embodiment of a single-rowed arrangement of discharge openings.

The invention has been set forth above with reference to a double-rowed arrangement of the discharge openings. Application of the teachings of the invention, however, also yields advantages when constructing a write head wherein the discharge openings are situated in a single row. FIG. 6 shows an exemplary embodiment of this. In detail, FIG. 6 shows a part of the layer-by-layer structure of a write head, whereby only the base member 1 with the discharge openings 2 arranged in one row as well as a part of the insulating layers 3, 4 and 5 are shown. In the full structure, the insulating layers 3, 5 and 5 would be applied to the base member 1 on all sides and, together with this and a cover plate 6 upwardly terminating the overall arrangement, would surround and bound an ink chamber 7 in an inktight fashion.

In this embodiment, the individual conductor loops 8 are realized by two legs 25 of conductive material which are connected to one another in the region of a discharge opening 2 and form the movable middle part 11 there. The legs 25 of the conductor loops 8 are secured to one and the same side of the ink chamber 7. Under the influence of the magnet system (not shown here), the movable middle part 11 is downwardly moved and an ink droplet is ejected from the discharge opening 2 given a change in the current flux through one of the conductor loops 8. The feed of the ink channel 10 with ink ensues (in a fashion which is likewise not shown) via an ink supply system in which the ink chamber 7 is in communication with an ink reservoir. Given such a structure, the discharge openings 2 can be arranged very close to the edge or at the edge of the write head. Connected therewith is the significant advantage that the characters or patterns applied to the recording medium in practical employment are visible immediately after printing and the recording medium can be severed immediately after a written line.

As is apparent from the foregoing specification, the invention is susceptible of being embodied with various alterations and modifications which may differ particularly from those that have been described in the preceeding specification and description. It should be understood that I wish to embody within the scope of the patent warranted hereon all such modifications as reasonably and properly come within the scope of my contribution to the art.

I claim as my invention:

1. In an arrangement for the ejection of individual droplets from discharge openings of an ink printer head having comprising individually selectable drive elements allocated to the discharge openings, said drive elements, fashioned as conductor loops, proceeding in an ink chamber and including a movable middle part in the region of the ink channel, whereby said ink chamber is formed by a base member containing said discharge openings, by lateral walls and by a cover, as well as including a magnet system whose field lines penetrate said conductor loops, the improvement comprising each conductor loop having both its ends secured mutually insulated at one side of said ink chamber such that webs of said conductor loops extend arrow-like into said ink chamber and form a U-shaped, movable middle part in the region of said ink channel and said magnet system having field lines that penetrate said webs in the immediate proximity of said U-shaped, movable middle parts.

2. An arrangement according to claim 1, wherein said conductor loops are composed of two webs whose low ends are respectively secured to the same side of said ink chamber; and in that said webs are connected to one another in the region of said ink channel and form said movable middle parts.

3. Arrangement according to claim 1, wherein said conductor loops are fashioned of band-shaped strips whose two legs are respectively secured to the same side of said ink chamber, are shaped U-shaped in the region of said ink channel and form said movable middle parts.

4. An arrangement according to claim 1, wherein said webs or legs secured to said one side of said ink chamber form a first row of conductor loops and said webs secured to the other side thereof form a second row of conductor loops to which two rows of discharge openings an respectively allocated.

5. An arrangement according to claim 4, wherein a partition is provided in said ink channel between said first and said second row of U-shaped, movable middle parts of said conductor loops.

6. An arrangement according to claim 5, wherein said partition subdivides said ink channel into two sub-channels which are in communication with a common ink supply system.

7. An arrangement according to claim 5, wherein said partition subdivides said ink channel into two sub-channels which are in communication with two separate ink supply systems.

8. An arrangement according to claim 1, wherein said webs of said conductor loops respectively secured to one side of said ink chamber form a row of movable middle parts fashioned U-shaped in the region of said ink channel with a row of discharge openings being allocated thereto; and in that said middle parts and said discharge openings are situated in the immediate proximity of the edge of said ink printer head.

9. An arrangement according to claim 1, wherein said magnet system is composed of a two-poled magnet element whose poles lie above said cover plate, lying respectively in the region of said fastenings of said conductor loops.

10. An arrangement according to claim 1, wherein said magnet system is ccmposed of a three-poled magnet element, whereby two like poles lie in the region of said fastening of said conductor loops and the other pole lies in the region of said ink channel, lying above said cover plate.

* * * * *